United States Patent
Lee et al.

(10) Patent No.: US 8,674,000 B2
(45) Date of Patent: Mar. 18, 2014

(54) MULTI-LAYERED PAPER COATING LATEX HAVING HIGH SWELLING AND CONTRACTION PROPERTY, METHOD FOR PREPARING THE SAME, AND PAPER COATING COMPOSITION CONTAINING THE SAME

(75) Inventors: Dae-Ho Lee, Daejeon (KR); Ji-Sang Jeong, Daejeon (KR); Chang-Sun Han, Daejeon (KR)

(73) Assignee: LG Chem, Ltd. (KR)

( * ) Notice: Subject to any disclaimer, the term of this patent is extended or adjusted under 35 U.S.C. 154(b) by 916 days.

(21) Appl. No.: 11/977,157

(22) Filed: Oct. 23, 2007

(65) Prior Publication Data

US 2008/0097019 A1   Apr. 24, 2008

(30) Foreign Application Priority Data

| Oct. 24, 2006 | (KR) | 10-2006-0103484 |
| Aug. 30, 2007 | (KR) | 10-2007-0087488 |

(51) Int. Cl.
*C08L 83/00*   (2006.01)
*C08L 3/00*    (2006.01)

(52) U.S. Cl.
USPC ................ 523/201; 524/556; 428/407

(58) Field of Classification Search
USPC .................. 524/556; 428/407; 523/201
See application file for complete search history.

(56) References Cited

U.S. PATENT DOCUMENTS

| 3,970,629 | A |   | 7/1976 | Izaki et al. |
| 4,059,552 | A | * | 11/1977 | Zweigle et al. ............ 524/555 |
| 4,331,738 | A |   | 5/1982 | Kuan |
| 5,405,907 | A | * | 4/1995 | Bowman et al. .......... 524/446 |
| 5,618,888 | A |   | 4/1997 | Choi et al. |
| 5,700,852 | A |   | 12/1997 | Iwanaga et al. |
| 5,703,157 | A |   | 12/1997 | Fujiwara et al. |
| 5,770,303 | A |   | 6/1998 | Weinert et al. |
| 5,776,842 | A |   | 7/1998 | Wood et al. |
| 5,872,189 | A |   | 2/1999 | Bett et al. |
| 6,342,550 | B1 |  | 1/2002 | Ishii et al. |
| 6,440,535 | B1 |  | 8/2002 | Iu et al. |
| 6,750,297 | B2 | * | 6/2004 | Yeu et al. ................. 525/243 |
| 6,989,191 | B2 |  | 1/2006 | Weissgerber et al. |
| 7,019,072 | B2 | * | 3/2006 | Choi et al. ............... 524/801 |
| 7,256,229 | B2 | * | 8/2007 | Yeu et al. ................. 524/157 |
| 7,612,128 | B2 | * | 11/2009 | Choi et al. ............... 523/326 |
| 2002/0132861 | A1 |  | 9/2002 | Uchiyama et al. |
| 2003/0105222 | A1 | * | 6/2003 | Choi et al. ............... 524/801 |
| 2004/0249055 | A1 | * | 12/2004 | Yeu et al. ................. 524/556 |
| 2006/0089454 | A1 | * | 4/2006 | Choi et al. ............... 524/700 |
| 2006/0140902 | A1 |  | 6/2006 | MacDonald et al. |
| 2006/0263602 | A1 | * | 11/2006 | Choi et al. ............... 428/407 |
| 2007/0049662 | A1 | * | 3/2007 | Han et al. ................. 524/27 |
| 2007/0237738 | A1 |  | 10/2007 | Hanzlicek et al. |

FOREIGN PATENT DOCUMENTS

| DE | 19512999 A1 | 10/1995 |
| JP | 57-185372 A | 11/1982 |
| JP | 61-271311 A | 12/1986 |
| JP | 7166492 | 6/1995 |
| KR | 20030037440 A | 5/2003 |
| KR | 20050004949 A | 1/2005 |
| WO | 97/32082 | 9/1997 |

OTHER PUBLICATIONS

Willoughby et al, TAPPI Journal, vol. 3, No. 8, p. 25-31, (2004).
Drage et al, TAPPI Journal (1998), vol. 81, No. 11, p. 175-184.

* cited by examiner

*Primary Examiner* — Hannah Pak
(74) *Attorney, Agent, or Firm* — Lerner, David, Littenberg, Krumholz & Mentlik, LLP

(57) ABSTRACT

Disclosed are paper coating latex, a method for preparing the same, and paper coating composition containing the same, characterized in that in the paper coating latex having a core-shell structure, the core is formed by the polymerization of monomer mixtures comprising 5 to 10 weight parts of ethylene unsaturated acid based on 100 weight parts of the core, wherein the amount of ethylene unsaturated acid in the shell is less than that in the core, and the shell has glass transition temperature up to room temperature, lower than that of the core. The present invention has an effect of providing a high quality matte coated paper that has excellent printability such as ink drying rate, adhesion, etc., as well as low white paper gloss and improved print gloss by coating paper coating composition containing multi-layered paper coating latex having high swelling and contraction property on paper.

16 Claims, No Drawings

US 8,674,000 B2

MULTI-LAYERED PAPER COATING LATEX HAVING HIGH SWELLING AND CONTRACTION PROPERTY, METHOD FOR PREPARING THE SAME, AND PAPER COATING COMPOSITION CONTAINING THE SAME

CROSS REFERENCE TO THE RELATED APPLICATION

This application claims the benefit of the filing date of Korean Patent Application Nos. 10-2006-0103484 & 10-2007-0087488 filed on Oct. 24, 2006 and Aug. 30, 2007, respectively, in the Korean Intellectual Property Office, the disclosures of which are incorporated herein in their entirety by reference.

TECHNICAL FIELD

The present invention relates to paper coating latex, a method for preparing the same, and paper coating composition containing the same, and more specifically, to a multi-layered paper coating latex having high swelling and contraction property, a method for preparing the same, and paper coating composition containing the same providing a high quality matte coated paper that has excellent printability such as ink drying rate, adhesion, etc., as well as low white paper gloss and improved print gloss.

BACKGROUND OF THE INVENTION

A coated paper has a problem that when the gloss of coated surface is excessively good, it causes glare under strong light to lead to eye strain. Therefore, the interest in high quality matte paper, which has low glare and gives subdued and relaxed feeling, has been recently increased. In particular, the market demands of the high quality matte paper show a tendency to increase in North America and Europe.

Generally, the coated paper is prepared by coating inorganic pigments such as clay, ground calcium carbonate (GCC), aluminum hydroxide, titanium oxide etc., on paper, wherein the gloss and nature of the coated paper surface are significantly influenced by inorganic pigment property. As an example, in the case where the clay is used, print gloss and adhesion are good, but brightness property is degraded. On the other hand, in the case where the inorganic pigment such as the ground calcium carbonate is used, it has advantages that glossiness is relatively low, ink receptivity is good and brightness is excellent as well as since it is inexpensive, cost reduction is achieved, as compared to the case where the clay is used.

The inorganic pigments such as the ground calcium carbonate, etc., for the purpose of matte coating have generally been used up to now. In this case, however, the ink is too rapidly infiltrated into a coating layer so that the print gloss is low and the adhesion is degraded. Therefore, there has been reported an example where different physical properties are compromised by properly mixing the clay and the ground calcium carbonate so that they are optimized (TAPPI Journal (1998), vol. 81, no. 11, p. 175).

Recently, the matte coated paper has been produced using talc. However, the talc has problems that it has poor dispersibility and its viscosity is excessively increased with the passage of time. An example of improving the problems as above has been reported (TAPPI Journal (2004), vol. 3, no. 8, p. 25).

Furthermore, Japan Laid-Open No. H7-166492 and International Application WO 97-032082, and the like are technologies that use organic pigments in a hollow structure, and include the contents that prepare the coating layer containing calcium carbonate, which is inorganic pigment, and the organic pigment in the hollow structure with shock-absorbing nature. Preferably, there has been reported that the coated paper is not subject to calandering in order to better implement the matted property.

Meanwhile, the structure and surface nature of the entire coating layer are varied according to the physical and chemical properties of paper coating latex. This has a significant effect on printability such as, white paper gloss, print gloss, ink drying rate, etc. When the particle diameter of latex becomes large, the content of latex in the coating layer composition becomes low, or the glass transition temperature becomes high, the inorganic pigment arrangement is easily made so that the white paper gloss is increased but the adhesion is degraded. On the other hand, when the particle diameter of latex becomes small, the content of latex in the coating layer composition becomes large, or the glass transition temperature becomes low, the air permeability of the coating layer is degraded so that there is ink solvent on the surface of the coating layer until ink components have a stabilized arrangement after printing, making it possible to improve the print gloss. However, this is the method that is contrary to the method of improving the white paper gloss, wherein this method has advantages that the ink drying rate is degraded and causes problems such as print mottle and set off phenomenon, etc.

Also, the surface energy of paper coating latex has an effect on the printability such as the white paper gloss, the print gloss, the ink drying rate, etc. For example, when the surface of latex has large hydrophilic property or functional group with large chemical resistance against ink solvent, the infiltration rate of in components, which are hydrophobic property, is slow so that the print gloss is improved.

As described above, the white paper gloss can be lowered and the print gloss can be improved by means of the method of changing the latex properties, such as the method of controlling the size of the particle diameter of paper coating latex, the glass transition temperature, and the surface energy; however, the method remarkably degrades the ink dryness and cannot help using the method of controlling the inorganic/organic pigments in order to reveal the matte coated paper properties and at the same time, has a difficulty in improving the printability such as adhesion, water resistance, inking property, ink dryness, etc.

SUMMARY OF THE INVENTION

In order to solve the problems of the prior art as above, it is an object of the present invention to provide a multi-layered paper coating latex having high swelling and contraction property and a method for preparing the same capable of providing high quality matte coated paper that has excellent printability such as ink drying rate, adhesion, etc., as well as low white paper gloss and improved print gloss.

Also, it is another object of the present invention to provide paper coating composition containing the paper coating latex and a coated paper coated with the paper coating composition.

The above objects and other objects of the present invention can be achieved by means of the present invention described below.

In order to accomplish the above objects, the present invention provides paper coating latex and a method of preparing the same characterized in that in the paper coating latex having a core-shell structure, the core is formed by the polymerization of monomer mixtures comprising 5 to 35 weight parts of ethylene unsaturated acid based on 100 weight parts of the core and the shell has glass transition temperature up to room temperature, lower than that of the core. The shell is formed by the polymerization of monomer mixtures comprising up to 10 weight parts of ethylene unsaturated acid based on 100 weight parts of the shell and is prepared from the content ratio of ethylene unsaturated acid lower than that of ethylene unsaturated acid used when preparing the core.

Furthermore, the present invention provides paper coating composition containing the paper coating latex and a coated paper coated with the paper coating composition.

DETAILED DESCRIPTION OF THE INVENTION

As described above, the present invention has an effect of providing a high quality matte coated paper that has excellent printability such as ink drying rate, adhesion, etc., as well as low white paper gloss and improved print gloss, by using paper coating composition containing multi-layered paper coating latex having high swelling and contraction properties.

Hereinafter, the present invention is described in detail.

The present inventors complete the present invention as follows: in preparing paper coating latex having swelling and contraction properties under an alkali condition and a dry process, the multi-layered paper coating latex having high swelling and contraction property is prepared including a core that is formed by the polymerization of monomer mixtures containing ethylene unsaturated acid comprising 5 to 35 weight parts of 100 weight parts of the core and a shell that has glass transition temperature up to room temperature, lower than that of the core, and has the content ratio of ethylene unsaturated acid used when preparing the shell lower than that of ethylene unsaturated acid used when preparing the core, and paper coating composition containing the prepared paper coating latex and ground calcium carbonate is prepared and is then coated on paper, whereby coated paper satisfying several printability such as adhesion, inking property, water resistance etc., as well as having low white paper gloss and improved print gloss is formed.

The paper coating latex of the present invention is the multi-layered paper coating latex including the core and the shell, wherein the core is prepared comprising 5 to 35 weight parts of ethylene unsaturated acid based on 100 weight parts so that the swelling property is maximized under an alkali condition, and the shell has the content ratio of ethylene unsaturated acid used when preparing the shell lower than that of ethylene unsaturated acid used when preparing the core and has glass transition temperature up to room temperature and lower than that of the core so that the swelling can be obtained at room temperature and the contraction is easily obtained when drying.

The paper coating latex is styrene-butadiene based or styrene-acrylate based latex as a basic structure and can be prepared by means of well-known emulsion polymerization.

When the paper coating latex is the styrene-butadiene based latex, as a concrete example, it can be prepared from monomer mixtures comprising 1 to 60 weight parts of butadiene, 15 to 80 weight parts of styrene, 2 to 10 weight parts of ethylene unsaturated acid, and 0 to 20 weight parts of vinyl-based monomers capable of being copolymerized with the above components, based on 100 weight parts of the paper coating latex.

When the paper coating latex is the styrene-acrylate based latex, as a concrete example, it can be prepared from monomer mixtures comprising 5 to 70 weight parts of butyl acrylate, 10 to 70 weight parts of styrene, 2 to 10 weight parts of ethylene unsaturated acid, and 0 to 20 weight parts of vinyl-based monomers capable of being copolymerized with the above components, based on 100 weight parts of the paper coating latex.

As the copolymerizable vinyl-based monomers, unsaturated carboxylic acid alkyl ester such as acrylonitrile, methacrylonitrile, methyl acrylate, methyl methacrylate, ethyl acrylate, butyl acrylate, butyl methacrylate, etc; unsaturated carboxylic acid hydroxyl alkyl ester such as β-hydroxy ethyl acrylate, β-hydroxy propyl acrylate, β-hydroxy ethyl methacrylate, etc; unsaturated carboxylic acid amide such as acrylamide, methacrylamide, itaconicamide, maleic monoamide, and the like and derivatives thereof; or aromatic vinyl-based monomer such as α-methyl styrene, vinyltoluene, p-methyl styrene, etc., can be used singly or in combination with at least two of them.

The paper coating latex will be described in detail below in order of a seed, a core, and a shell, etc.

<Seed Stably Controlling Final Latex Particle Size>

In the present invention, the seed is preferably used to stably control the particle size of the final paper coating latex, but it is not necessarily used.

As for the seed, if it is a spherical particle in the range of 20 to 160 nm, it is used without limitation on its composition or component; however, styrene-butadiene based or styrene-acrylate based polymer is preferably used. As a concrete example, the styrene-butadiene based or styrene-acrylate based polymer seed can be prepared by adding 5 to 10 weight parts of an emulsifier, 0.1 to 0.2 weight parts of a molecular weight regulator, 0.2 to 0.5 weight parts of an electrolyte, 0.5 to 1 weight parts of a polymerization initiator and 400 to 500 weight parts of an ion exchange water (based on 100 weight parts of a monomer mixture), to 100 weight parts of the monomer mixture comprising 25 to 35 weight parts of butadiene or 35 to 50 weight parts of butyl acrylate, 35 to 60 weight parts of styrene, 5 to 15 weight parts of methyl methacrylate, 2 to 10 weight parts of acrylonitrile and 1 to 8 weight parts of itaconic acid; and then performing emulsion polymerization.

<Core Comprising 5 to 35 Weight Parts of Ethylene Unsaturated Acid>

A core can be prepared by polymerizing the seed, a hydrophilic monomer and a monomer having acid group, and ethylene unsaturated acid is preferably used as the monomer having acid group.

The core includes a plurality of hydrophilic groups and the acid groups having the swelling property under alkali condition.

As the hydrophilic monomer, acrylamide, acrylonitrile, or methacrylonitrile, and the like can be used singly or in combination with at least two of them. As the ethylene unsaturated acid, acrylic acid, methacrylic acid, crotonic acid, itaconic acid, fumaric acid, or maleic acid, and the like can be used singly or in combination with at least two of them.

The content of ethylene unsaturated acid can be controlled according to the swelling property of the core, however, it preferably is 5 to 35 weight parts based on 100 weight parts of the total monomers included in the core. If 5 to 35 weight parts of ethylene unsaturated acid is used, the core layer is swelled at a size of at least 1.3 times as large as an average particle diameter without causing the problems that the shell layer is destroyed due to the excessive swelling of the core layer or the adhesion is decreased after the final drying due to the excessively high glass transition temperature.

As a concrete example, the core may be prepared, in presence of 2 to 15 weight parts of the seed, by adding 0.05 to 0.5 weight parts of an emulsifier, 0 to 10 weight parts of a molecular weight regulator or 0 to 10 weight parts of a cross-linkable monomer, 0.1 to 1.0 weight parts of sodium bicarbonate, 0.1 to 10 weight parts of a polymerization initiator and 35 to 55 weight parts of an ion exchange water (based on 100 weight parts of monomer mixtures), to 100 weight parts of the monomer mixtures comprising 0 to 50 weight parts of styrene, 4 to 50 weight parts of butadiene or 5 to 60 weight parts of butyl acrylate, 5 to 35 weight parts of methyl methacrylate, and 5 to 35 weight parts of ethylene unsaturated acid; and then performing polymerization.

The glass transition temperature of the core is preferably 5 to 100° C. The swelling property is excellent in the range of the glass transition temperature.

The gel content of the core is preferably 50 to 90%. The swelling property is excellent in the range of the gel content.

<Shell Having Glass Transition Temperature Lower than Room Temperature and Lower than that of Core>

The shell is prepared by mainly including hydrophobic monomer so that the mechanical and chemical stabilities of paper coating latex particles are ensured and the infiltration of strong hydrophobic ink solution is easily made to improve ink receptivity and ink drying rate. In some cases, the shell in at least two layered can be prepared.

As the hydrophobic monomer, styrene, methylstyrene, butadiene, alkyl acrylate, or alkyl methacrylate, etc., can be used singly or in combination with at least two of them.

As a concrete example, the shell can be prepared, in the presence of the core, by adding 0 to 10 weight parts of a molecular weight regulator or 0 to 10 weight parts of a cross-linkable monomer, 0.1 to 1.0 weight parts of sodium bicarbonate, 0.1 to 10 weight parts of polymerization initiator, and 35 to 55 weight parts of an ion exchange water (based on 100 weight parts of monomer mixtures), to 100 weight parts of the monomer mixtures comprising 0 to 50 weight parts of styrene, 15 to 55 weight parts of butadiene or 30 to 70 weight parts of butyl acrylate, 0 to 20 weight parts of methyl methacrylate, and 0 to 10 weight parts of ethylene unsaturated acid; and then performing polymerization.

As the ethylene unsaturated acid, acrylic acid, methacrylic acid, crotonic acid, itaconic acid, fumaric acid, or maleic acid, and the like can be used singly or in combination with at least two of them.

The ethylene unsaturated acid used for the preparation of the shell can be used to ensure the stability of latex particles and 1 to 5 weight parts based on 100 weight parts of paper coating latex is preferably within a lower range than the content ratio of ethylene unsaturated acid in the core. If the ethylene unsaturated acid is lower than the content, the stability of particles is decreased so that coagulum may be caused in a polymerization process or a coating composition preparation process and a coating process. If the ethylene unsaturated acid is larger than the content, the infiltration rate of strong hydrophobic ink solution is remarkably degraded due to an excessive increase of hydrophilic property after the final coating and dry so that the ink receptivity and the ink drying rate may be decreased.

The glass transition temperature of the shell is preferably −20 to 10° C. The stability and adhesion are excellent in the range of the glass transition temperature and the contraction is easily made in the drying process after the swelling process.

The gel content of the shell is preferably 70 to 95%. The mechanical stability of latex is excellent in the range of content.

If the thickness of the shell is within the range that the stability is maintained when swelling and contracting the paper coating latex, the thickness ratio of the shell to the core may be used without limitation.

The weight ratio of the shell to the core is preferably 3:7 to 7:3. With the weight ratio, it has effects that the swelling of the shell layer is easily made and the particle form is maintained in the swelling and contraction.

The molecular weight regulator and the cross-linkable monomer used in preparing the core and the shell are to control the molecular weight of the final latex and the structure and content of gel. As the molecular weight regulator, when the paper coating latex is the styrene-butadiene based latex, n-dodecyl mercaptan or t-dodecyl mercaptan can be used. The molecular weight regulator having 0 to 10 weight parts, preferably 0.2 to 5 weight parts of 100 weight parts of the monomer mixtures used in preparing the core or the shell can be used. When the molecular weight regulator having the content is used, it has effects that the reaction rate and reaction stability are excellent, the swelling/contraction is easily made by controlling the gel content of the final latex, and the stability of latex is excellent. Also, as the cross-linkable monomer, when the paper coating latex is the styrene-acrylate based latex, aryl acrylate, aryl methacrylate, ethylene glycol dimethacrylate, ethylene glycol diacrylate, diaryl phthalate, tripropylene glycol dimethacrylate, trimethylolpropane triacrylate, and the like can be used. The cross-linkable monomer having 0 to 10 weight parts, preferably 0.05 to 2 weigh parts of 100 weight parts of the monomer mixtures used in preparing the core or the shell can be used. When the cross-linkable monomer having the content is used, it has effects that the reaction rate and reaction stability are excellent, the structural stability of the final latex is excellent by controlling the gel content, and the swelling/contraction is easily made.

The glass transition temperature of paper coating latex is preferably −10 to 50° C.

The average particle diameter of paper coating latex is preferably 80 to 300 nm. Since the particle diameter within the range of average particle diameter is proper, when it is applied to the paper coating composition, the swelling effect is maximized and the adhesion is improved.

The pH of paper coating latex is preferably 4 to 5. When pH of 8 to 10 is included in the coating composition, it is preferably swelled at a size of at least 1.3 times as large as the average particle diameter of initial latex.

In order to control the increased viscosity of coating composition when the swelling effect of paper coating latex is maximized, the content of thickener can be controlled and used.

Generally, the pH of the proper paper coating composition is 8 to 10. Therefore, when preparing the paper composition using the paper coating latex, sodium hydroxide (NaOH) can be further added in order to control pH to 8 to 10.

The paper coating latex indicates high swelling property within the range that the pH of the generally used coating composition is 8 to 10. After the coating composition is coated on paper, the contraction action occurs in the drying process so that the inorganic pigment arrangement on the surface of the coating layer is nonuniform and the inside of the coating layer has many voids due to the nonuniform contraction of the swelled latex. The brightness of the coating surface is increased and the white paper gloss is remarkably lowered due to such properties.

Also, the paper coating latex prevents the infiltration of ink through the voids of the coating layer from excessively rapidly occurring by controlling the hydrophilic property of the surface of the paper coating latex so that the ink infiltration rate is properly controlled, thereby satisfying the print gloss and the ink drying rate at the same time.

The paper coating composition of the present invention includes the multi-layered paper coating latex having high swelling/contraction properties and the inorganic pigment.

The paper coating latex of 5 to 20 weight parts may be included based on 100 weight parts of ground calcium carbonate, which is an inorganic pigment.

The coated paper of the present invention is prepared by applying the paper coating composition.

Hereinafter, although preferred embodiments will be described to help the understandings of the present invention, the following embodiments are given only by way of illustration of the present invention and it is obvious to those skilled in the art that many changes and modifications within the scope of the present invention may be made without departing from the spirit thereof and such changes and modifications are within the scope of the appended claims.

EXAMPLE

Example 1

Preparation of Paper Coating Latex

Preparation of Core

After purging with nitrogen in a 10 l pressure reactor mounted with an agitator, a thermometer, a cooler, and an inlet of nitrogen gas and into which a monomer, an emulsifier, and a polymerization initiator can be continuously injected, the seed was prepared by filling with 33 weight parts of butadiene, 40 weight parts of styrene, 12 weight parts of methyl methacrylate, 8 weight parts of acrylonitrile, 5 weight parts of itaconic acid, 4 weight parts of sodium dodecylbenzenesulfonate, 2 weight parts of sodium metallic sulfonate, 0.15 weight part of t-dodecyl mercaptan, 0.5 weight parts of sodium bicarbonate, 420 weight parts of ion exchange water therein and raising the temperature to 65° C., and then putting 1 weight part of potassium persulfate, which is the polymerization initiator, therein and agitating and polymerizing them for about 300 minutes. The average particle diameter of the obtained seed was 70 nm, the gel content thereof was 83%, and the conversion rate was 98 wt %.

The core was prepared by adding 5 weight parts of the prepared seed latex in the reactor and raising the temperature to 70° C., and injecting continuously for 120 minutes 3.2 weight part of styrene, 14.0 weight parts of butyl acrylate, 6.0 weight parts of methyl methacrylate, 6.0 weight parts of methacrylic acid, 0.8 weight part of itaconic acid, 0.06 weight part of sodium dodecylbenzenesulfonate, 0.12 weight part of sodium bicarbonate, 14.3 weight parts of ion exchange water, and 0.33 weight parts of potassium persulfate, and polymerizing them.

The average particle diameter of the obtained seed was 124 nm, the gel content was 87%, the glass transition temperature was 23° C., and the conversion rate was 94 wt %.

Preparation of Shell

In order to coat the shell on the prepared core latex, 26.4 weight parts of styrene, 35.0 weight parts of butyl acrylate, 7.0 weight parts of methyl methacrylate, 1.5 weight parts of methacrylic acid, 0.1 weight parts of aryl methacrylate, 0.14 weight part of sodium dodecylbenzenesulfonate, 0.28 weight part of sodium bicarbonate, 33.3 weight parts of ion exchange water, and 1.1 weight parts of potassium persulfate were continuously injected in the prepared core latex for 180 minutes and polymerized.

In the prepared final paper coating latex, the weight ratio of the core to the shell was 3:7, the average particle diameter was 181 nm, the gel content was 92%, the glass transition temperature was 8° C. (the glass transition temperature of the shell was 4° C.), the conversion rate was 97 wt %, and the pH was 4.1.

Preparation of Paper Coating Composition

The coating composition was prepared by adding 10 weight parts of the prepared paper coating latex, 100 weight parts of ground calcium carbonate, and 0.3 weight parts of oxidation starch, and adding sodium hydroxide to adjust pH 9 and the ion exchange water was added, thereby being 63% of the total solid content.

Preparation of Coated Paper

The coated paper is prepared by applying the prepared paper coating composition on base paper.
Coating: Mayop Laboratory Coater (MLC) coating
Rate: 150 m/min
Drying: 150° C., 5 seconds
Calendar: super calendar, 85° C., 100 kg/cm, 4 m/min, passing twice
Base paper: base paper on market (70 gsm)

Example 2

Preparation of the paper coating latex was performed in the same manner as described in Example 1 except that 15.2 weight part of styrene, 22.0 weight parts of butyl acrylate, 6.0 weight parts of methyl methacrylate, 6.0 weight parts of methacrylic acid, 0.8 weight part of itaconic acid, 0.06 weight part of sodium dodecylbenzenesulfonate, 0.12 weight part of sodium bicarbonate, 22.3 weight parts of ion exchange water, and 0.6 weight parts of potassium persulfate, were injected continuously to 5 weight parts of the seed latex and polymerized, thereby obtaining the core having the average particle diameter of 145 nm, the gel content of 89%, the glass transition temperature of 21° C., and the conversion rate of 94 wt %.

In order to coat the shell on the prepared core latex, an experiment was performed in the same manner as described in Example 1 except that 16.4 weight parts of styrene, 25.0 weight parts of butyl acrylate, 7.0 weight parts of methyl methacrylate, 1.5 weight parts of methacrylic acid, 0.1 weight part of aryl methacrylate, 0.14 weight part of sodium dodecylbenzenesulfonate, 0.28 weight part of sodium bicarbonate, 25.3 weight parts of ion exchange water, and 0.6 weight parts of potassium persulfate were continuously injected for 150 minutes to the prepared core latex and polymerized.

In the prepared final paper coating latex, the weight ratio of the core to the shell was 5:5, the average particle diameter was 180 nm, the gel content was 93%, the glass transition temperature was 11° C. (the glass transition temperature of the shell was 4° C.), the conversion rate was 98 wt %, and the pH was 4.3.

Example 3

Preparation of the paper coating latex was performed in the same manner as described in Example 1 except that 2.5 weight parts of styrene, 15.7 weight parts of butyl acrylate, 5.0 weight parts of methyl methacrylate, 4.0 weight parts of methacrylic acid, 2.0 weight parts of acrylic acid, 0.8 weight parts of itaconic acid, comprising 0.06 weight part of sodium dodecylbenzenesulfonate, 0.12 weight part of sodium bicarbonate, 14.3 weight parts of ion exchange water, and 0.6 weight parts of potassium persulfate, were injected continuously to 5 weight parts of the seed latex for 120 minutes and polymerized, thereby obtaining the core having the average particle diameter of 145 nm, the gel content of 86%, the glass transition temperature of 11° C., and the conversion rate of 93 wt %.

In order to coat the shell on the prepared core latex, an experiment was performed in the same manner as described in Example 1 except that 28.0 weight parts of styrene, 37.0 weight parts butyl acrylate, 3.0 weight parts of methyl methacrylate, 1.5 weight parts of acrylic acid, 0.5 weight parts of aryl methacrylate, 0.14 weight part of sodium dodecylbenzenesulfonate, 0.28 weight part of sodium bicarbonate, 33.3 weight parts of ion exchange water, and 0.6 weight parts of potassium persulfate, were injected continuously to the prepared core latex for 180 minutes and polymerized.

In the prepared final paper coating latex, the weight ratio of the core to the shell was 3:7, the average particle diameter was 180 nm, the gel content was 93%, the glass transition temperature was 6° C. (the glass transition temperature of the shell: −1° C.), the conversion rate was 97 wt %, and the pH was 4.3.

Example 4

Preparation of the paper coating latex was performed in the same manner as described in Example 1 except that 27 weight parts of butadiene, 55 weight parts of styrene, 10 weight parts of methyl methacrylate, 5 weight parts of acrylonitrile, 2 weight parts of itaconic acid, 1 weight part of bis(2-ethylene ureido ethyl)malate, 7 weight parts of alkyl benzene sulfonic acid sodium, 0.16 weight parts of t-dodecyl mercaptan, 0.35 weight parts of sodium bicarbonate, and 420 weight parts of ion exchange water, were injected into the pressure reactor and the temperature was raised to 60° C., and then 0.5 weight parts of polymerization initiator, potassium persulfate was added and agitated for about 300 minutes and polymerized. The average particle diameter of the prepared seed was 50 nm, the gel content was 70%, and the conversion rate was 95 wt %.

5 weight parts of the prepared seed latex was added in the reactor and polymerized, thereby obtaining the core having the average particle diameter of 92 nm, the gel content of 76%, the glass transition temperature of 23° C., and the conversion rate of 94 wt %.

An experiment was performed in the same manner as described in Example 1 except that the shell was coated on the prepared core latex.

In the prepared final paper coating latex, the weight ratio of the core to the shell was 3:7, the average particle diameter was 132 nm, the gel content was 88%, the glass transition temperature was 10° C. (the glass transition temperature of the shell: 4° C.), the conversion rate was 98 wt %, and the pH was 4.9.

Example 5

Preparation of the paper coating latex was performed in the same manner as described in Example 1 except that 5 weight parts of the seed latex prepared according to the Example 4 was added in the reactor and 2.7 weight parts of styrene, 14.0 weight parts of butyl acrylate, 6.0 weight parts of methyl methacrylate, 6.0 weight parts of methacrylic acid, 0.8 weight part of itaconic acid, 0.5 weight part of aryl methacrylate, 0.06 weight part of sodium dodecylbenzenesulfonate, 0.12 weight part of sodium bicarbonate, 14.3 weight parts of ion exchange water, and 0.33 weight parts of potassium persulfate, were injected continuously for 120 minutes and polymerized, thereby obtaining the core having the average particle diameter of 91 nm, the gel content of 80%, the glass transition temperature of 18° C., and the conversion rate of 95 wt %, and the shell was coated on the prepared core latex.

In the prepared final paper coating latex, the weight ratio of the core to the shell was 3:7, the average particle diameter was 131 nm, the gel content was 92%, the glass transition temperature was 12° C. (the glass transition temperature of the shell: 4° C.), the conversion rate was 98 wt %, and the pH was 4.1.

Example 6

Preparation of the paper coating latex was performed in the same manner as described in Example 1 except that 5 weight parts of the seed latex prepared according to the Example 4 was added in the reactor, and 6.7 weight parts of styrene, 10.5 weight parts of butadiene, 6.0 weight parts of methyl methacrylate, 6.0 weight parts of methacrylic acid, 0.8 weight parts of itaconic acid, 0.6 weight parts of t-dodecyl mercaptan, 0.06 weight part of sodium dodecylbenzenesulfonate, 0.12 weight part of sodium bicarbonate, 14.3 weight parts of ion exchange water, and 0.33 weight parts of potassium persulfate, were injected continuously for 120 minutes and polymerized, thereby obtaining the core having the average particle diameter of 93 nm, the gel content of 76%, the glass transition temperature of 22° C., and the conversion rate of 91 wt %.

In order to coat the shell on the prepared core latex, 35.0 weight parts styrene, 26.4 weight parts of butadiene, 7.0 weight parts of methyl methacrylate, 1.5 weight parts of methacrylic acid, 0.5 weight parts of t-dodecyl mercaptan, 0.14 weight part of sodium dodecylbenzenesulfonate, 0.28 weight part of sodium bicarbonate, 33.3 weight parts of ion exchange water, and 1.1 weight parts of potassium persulfate, were injected continuously in the prepared core latex for 180 minutes and polymerized.

An experiment was performed in the same manner as described in Example 1 except that after the above components were injected, the polymerization was completed by further agitating them for 100 minutes at 90° C.

In the prepared final paper coating latex, the weight ratio of the core to the shell was 3:7, the average particle diameter was 135 nm, the gel content was 73%, the glass transition temperature was 11° C. (the glass transition temperature of the shell: 4° C.), the conversion rate was 98 wt %, and the pH was 4.8.

Example 7

Preparation of the paper coating latex was performed in the same manner as described in Example 1 except that 5 weight parts of the seed latex prepared according to the Example 4 was added in the reactor, and 1.2 weight parts of styrene, 14.0 weight parts of butyl acrylate, 5.0 weight parts of methyl methacrylate, 9 weight parts of methacrylic acid, 0.8 weight parts of itaconic acid, 0.06 weight part of sodium dodecylbenzenesulfonate, 0.12 weight part of sodium bicarbonate, 14.3 weight parts of ion exchange water and 0.33 weight parts of potassium persulfate, were injected continuously for 120 minutes and polymerized the core having the average particle diameter of 92 nm, the gel content of 82%, the glass transition temperature of 24° C. and the conversion rate of 96 wt %, and the shell was coated on the prepared core latex.

In the prepared final paper coating latex, the weight ratio of the core to the shell was 3:7, the average particle diameter was 133 nm, the gel content was 93%, the glass transition temperature was 14° C. (the glass transition temperature of the shell: 4° C.), the conversion rate was 98 wt %, and the pH was 4.1.

Comparative Example 1

Preparation of the paper coating latex was performed in the same manner as described in Example 1 except that 5 weight parts of the seed latex was added in the reactor and the temperature was raised to 75° C., and then 36.7 weight parts of styrene, 58.5 weight parts of butyl acrylate, 2.0 weight parts of acrylic acid, 2.8 weight parts of itaconic acid, 0.3 weight part of sodium dodecylbenzenesulfonate, 0.4 weight part of sodium bicarbonate, 55 weight parts of ion exchange water, and 1.1 weight parts of potassium persulfate, were injected continuously for 300 minutes and polymerized, thereby obtaining latex having one shell, not a multi-layered including the core and the shell.

In the prepared final paper coating latex, the average particle diameter was 180 nm, the gel content was 85%, the glass transition temperature was 0° C., the conversion rate was 98 wt %, and the pH was 4.6.

Comparative Example 2

Preparation of the paper coating latex was performed in the same manner as described in Example 1 except that 3.9 weight parts of the seed latex prepared according to the Example 4 was added in the reactor and the temperature was raised to 78° C., and then 23.2 weight part of styrene, 21.7 weight parts of butadiene, 1.2 weight parts of acrylic acid, 1.0 weight parts of itaconic acid, 0.2 weight parts of acrylamide, 2.7 weight parts of acrylonitrile, 0.2 weight parts of sodium bicarbonate, 0.1 weight part of sodium dodecylbenzenesulfonate, 16.3 weight parts of ion exchange water, and 0.6 weight parts of potassium persulfate, were injected continuously for 120 minutes and polymerized, thereby obtaining the core having the average particle diameter of 115 nm, the gel content of 74%, the glass transition temperature of −8° C., and the conversion rate of 93 wt %.

In order to coat the shell on the prepared core latex, an experiment was performed in the same manner as described in Example 1 except that 27.0 weight parts of styrene, 18.6 weight parts of butadiene, 1.2 weight parts of acrylic acid, 0.3 weight parts of itaconic acid, 0.2 weight parts of acrylamide, 2.7 weight parts of acrylonitrile, 0.2 weight parts of sodium bicarbonate, 0.1 weight part of sodium dodecylbenzenesulfonate, 16.3 weight parts of ion exchange water, and 0.6 weight parts of potassium persulfate, were injected continuously for 180 minutes and polymerized.

In the prepared final paper coating latex, the average particle diameter was 143 nm, the gel content was 78%, the glass transition temperature was 2° C. (the glass transition temperature of the shell: 4° C.) the conversion rate was 98 wt %, and the pH was 4.7.

Comparative Example 3

Preparation of the paper coating latex was performed in the same manner as described in Example 1 except that the seed latex comprising 5 weight parts prepared according to the example 4 in the reactor and 6.2 weight parts of styrene, 15.5 weight parts of butyl acrylate, 6.0 weight parts of methyl methacrylate, 1.5 weight parts of methacrylic acid, 0.8 weight parts of itaconic acid, 0.06 weight part of sodium dodecylbenzenesulfonate, 0.12 weight part of sodium bicarbonate, 14.3 weight parts of ion exchange water, and 0.33 weight parts of potassium persulfate, were injected continuously for 180 minutes and polymerized, thereby obtaining the core having the average particle diameter of 91 nm, the gel content of 80%, the glass transition temperature of 9° C., and the conversion rate of 94 wt %.

In order to coat the shell on the prepared core latex, an experiment was performed in the same manner as described in Example 1 except that comprising 12.4 weight parts of styrene, comprising 37.5 weight parts of butyl acrylate, 7.0 weight parts of methyl methacrylate, 13.0 weight parts of methacrylic acid, 0.1 weight parts of aryl methacrylate, 0.14 weight part of sodium dodecylbenzenesulfonate, 0.28 weight part of sodium bicarbonate, 33.3 weight parts of ion exchange water, and 1.1 weight parts of potassium persulfate, were injected continuously in the prepared core latex for 180 minutes and polymerized.

In the prepared final paper coating latex, the weight ratio of the core to the shell was 3:7, the average particle diameter was 132 nm, the gel content was 92%, the glass transition temperature was 7° C. (the glass transition temperature of the shell: 5° C.), the conversion rate was 98 wt %, and the pH was 4.1.

Experimental Example

The physical properties of paper coating latex and the paper coating composition prepared in the Examples and the Comparative examples were measured according to the following methods. The physical properties of the coated paper prepared by applying the paper coating composition were measured according to the following methods and the results thereof were presented in the following table 1.

a) Latex particle diameter—The pH of the prepared paper coating latex was 4 to 5. At this time, the particle diameter of latex and the particle diameter after the swelling at the pH of 9 were measured by means of a Laser Scattering Analyzer (Nicomp).

b) Low shear viscosity—It was measured by means of a Brookfiled viscometer. The viscosity of the paper coating composition was represented by a value (unit: cP) measured after 1 minute at 60 rpm by means of a No. 3 rotor.

c) High shear viscosity—It was represented by a value (unit: Cp) measured at 6600 rpm by means of a Hercules Viscometer (KRK type, model KC-801C).

d) Gel content—The paper coating latex subjected to polymerization was dried at room temperature for at least 24 hours to form a film. The film is sufficiently formed and was then cut at a sample with a proper size. Thereafter, the sample puts in a 200 mesh net and was sufficiently melted in a large amount of tetrahydrofuran. If the sample was melted for at least 14 hours, the content of the insoluble matter was not changed any more. Next, the sample was sufficiently melted all day long and the mesh net having the insoluble matter was taken out and was dried at an oven of 130° C. for 30 minutes. The weight of the dried insoluble matter was measured so that its content was represented by percentage.

e) Adhesion—The degree of tearing was judged with the naked eye after being printed by an RI printer several times and was evaluated and measured by a five-point method. The higher the point, the better the adhesion was indicated. It was measured by using each ink with tack values of 12, 14, and 16 and was then represented by an average value.

f) Water resistance—The print was performed after adding damping water by using a molten roll in the RI printer and the degree of tearing was measured by the same method as used in the adhesion. It was printed one times by using ink with tack values of 10 to 14 and was then measured and represented by an average value.

g) Ink drying rate—After being printed by the RI printer, the degree smeared with ink with the passage of time was measured by the five-point method, the higher the point, the faster the ink dry speed was indicated.

h) Inking property—The print was preformed after adding damping water to measure ink transition. The ink with low tack value was used to prevent the tearing. The higher the point, the better the inking property was indicated.

i) White paper gloss—several portions of the coated paper were measured by means of an optical gloss meter (HUNTER type, 75°~75°) so that they are represented by an average value.

j) Print gloss—after the print was performed by the RI printer and 24 hours elapsed, it was measured by the same method as used in the white glass.

TABLE 1

| Sort | Ex. 1 | Ex. 2 | Ex. 3 | Ex. 4 | Ex. 5 | Ex. 6 | Ex. 7 | Comp. ex. 1 | Comp. ex. 2 | Comp. ex. 3 |
| --- | --- | --- | --- | --- | --- | --- | --- | --- | --- | --- |
| Prepared particle diameter (nm)(pH 4~5) | 181 | 180 | 180 | 132 | 131 | 135 | 133 | 180 | 143 | 132 |
| Particle diameter after swelling (nm)(pH 9) | 240 | 235 | 250 | 235 | 215 | 225 | 233 | 191 | 152 | 267 |
| lower shear viscosity | 1320 | 1370 | 1310 | 1450 | 1420 | 1430 | 1530 | 1280 | 1300 | 2100 |
| high shear viscosity | 22.1 | 23.1 | 22.7 | 21.8 | 21.7 | 22.5 | 23.7 | 20.8 | 20.3 | 26.3 |
| white paper gloss | 39.3 | 37.3 | 38.4 | 37.2 | 36.3 | 39.1 | 37.1 | 46.1 | 46.4 | 41.2 |
| print gloss | 86.5 | 87.0 | 86.0 | 87.9 | 87.5 | 87.8 | 88.5 | 82.6 | 83.1 | 88.9 |
| ink drying rate | 4.1 | 4.1 | 4.0 | 4.2 | 4.2 | 4.2 | 3.9 | 4.2 | 4.1 | 3.5 |
| adhesion | 4.1 | 4.1 | 4.1 | 4.3 | 4.2 | 4.3 | 4.2 | 4.2 | 4.3 | 3.9 |
| water-resistance | 3.7 | 3.7 | 3.7 | 4.2 | 4.1 | 4.1 | 4.1 | 4.0 | 4.2 | 3.8 |
| inking property | 4.3 | 4.3 | 4.3 | 4.2 | 4.2 | 4.2 | 4.3 | 4.0 | 3.8 | 4.1 |

Example: Ex.
Comparative Example:
Comp. Ex.

Example: Ex

Comparative Example: Comp. Ex

It can be confirmed from the table 1 that the paper coating latex of the Examples 1 to 7 including the core containing 5 to 35 weight parts of ethylene unsaturated acid based on 100 weight parts of the core and the shell having glass transition temperature up to room temperature and the glass transition temperature lower than that of the core according to the present invention remarkably lowers the white paper gloss, has excellent print gloss, and satisfies the printability such as ink drying rate, and inking property, adhesion etc., as compared to the paper coating latex generally used in the Comparative examples 1 and 2 according to the prior art. In particular, it can be confirmed that the paper coating latex of the Examples 4 to 7 indicates excellent physical properties such as more improved adhesion and water-resistance due to a small average particle diameter. Also, contrary to the Examples, when many acid monomers are used in the preparation of the shell as in the Comparative example 3, it can be confirmed that the ink drying rate and the adhesion are remarkably decreased. When acid group is too many included in the outer portion and surface of the polymerized particle, the infiltration rate of ink solvent is decreased due to the increase of hydrophilic property to slow the ink drying rate. Also, the acid group is mainly distributed into the outer portion of the polymerized particle so that the flexibility and deformability of the particle surface are relatively reduced, thereby reducing the adhesion.

What is claimed is:

1. A paper coating latex comprising a core-shell structure, wherein:
   (A) the core is formed by polymerization of monomer mixtures comprising:
      (1) 13.6 to 35 weight parts of ethylene unsaturated acid;
      (2) 0 to 50 weight parts of styrene;
      (3) 4 to 50 weight parts of butadiene or 5 to 60 weight parts of butyl acrylate and 5 to 35 weight parts of methyl methacrylate based on 100 weight parts of the total monomers in the core; and
   wherein:
   (B) the shell comprises:
      (4) 1 to 5 weight parts of ethylene unsaturated acid;
      (5) 0 to 50 weight parts of styrene;
      (6) 15 to 55 weight parts of butadiene or 30 to 70 weight parts of butyl acrylate and 0 to 20 weight parts of methyl methacrylate based on 100 weight parts of said paper coating latex;
   and wherein:
   (C) the amount of the ethylene unsaturated acid in the shell is less than that in the core;
   (D) the ethylene unsaturated acid is one or more selected from the group consisting of acrylic acid, methacrylic acid, crotonic acid, itaconic acid, fumaric acid and maleic acid;
   (E) the paper coating latex is styrene-butadiene based latex or styrene-acrylate based latex;
   (F) the glass transition temperature of the core is 5 to 100° C.;
   (G) the glass transition temperature of the shell is −20 to 10° C. and lower than that of the core;

(H) the gel content of the core is 76 to 90% and the gel content of the shell is 70 to 95%;

(I) the paper coating latex swells at a size of at least 1.3 times an average particle diameter in a coating composition of pH 8 to 10; and (J) the pH of the paper coating latex is 4 to 5.

2. The paper coating latex of claim 1, wherein the shell comprises at least one layer.

3. The paper coating latex of claim 1, wherein the average particle diameter of the paper coating latex is 80 to 300 nm.

4. The paper coating latex of claim 1, wherein the glass transition temperature of the paper coating latex is −10 to 50° C.

5. The paper coating latex of claim 1, wherein the weight ratio of core to shell is 3:7 to 7:3.

6. The paper coating latex of claim 1, wherein the paper is a print sheet.

7. The paper coating latex of claim 1, further comprising one or more cross-linkable monomer selected from the group consisting of aryl acrylate, aryl methacrylate, ethylene glycol dimethacrylate, ethylene glycol diacrylate, diaryl phthalate, tripropylene glycol dimethacrylate, and trimethylolpropane triacrylate.

8. The paper coating latex of claim 1, wherein the styrene-butadiene based latex is prepared by polymerizing monomer mixtures comprising 1 to 60 weight parts of butadiene, 15 to 80 weight parts of styrene, 2 to 10 weight parts of ethylene unsaturated acid, and 0 to 20 weight parts of vinyl-based monomers capable of being copolymerized with the above components, based on 100 weight parts of the paper coating latex.

9. The paper coating latex of claim 1, wherein the styrene-acrylate based latex is prepared by polymerizing monomer mixtures comprising 5 to 70 weight parts of butyl acrylate, 10 to 70 weight parts of styrene, 2 to 10 weight parts of ethylene unsaturated acid monomers, and 0 to 20 weight parts of vinyl-based monomers capable of being copolymerized with the above monomers, based on 100 weight parts of the paper coating latex.

10. The paper coating latex of claim 8, wherein the copolymerizable vinyl-based monomer is one or more selected from the group consisting of acrylonitrile, methacrylonitrile, methyl acrylate, methyl methacrylate, ethyl acrylate, butyl acrylate, butyl methacrylate; β-hydroxy ethyl acrylate, β-hydroxy propyl acrylate, β-hydroxy ethyl methacrylate; acrylamide, methacrylamide, itaconicamide, maleic acid monoamide and derivatives thereof; and α-methyl styrene, vinyltoluene, p-methyl styrene.

11. The paper coating latex of claim 9, wherein the copolymerizable vinyl-based monomer is one or more selected from the group consisting of acrylonitrile, methacrylonitrile, methyl acrylate, methyl methacrylate, ethyl acrylate, butyl acrylate, butyl methacrylate; β-hydroxy ethyl acrylate, β-hydroxy propyl acrylate, β-hydroxy ethyl methacrylate; acrylamide, methacrylamide, itaconicamide, maleic acid monoamide and derivatives thereof; and α-methyl styrene, vinyltoluene, p-methyl styrene.

12. A method for preparing paper coating latex having a core-shell structure comprising the steps of:

a) preparing a core by polymerizing monomer mixtures comprising 13.6 to 35 weight parts of ethylene unsaturated acid, 0 to 50 weight parts of styrene, 4 to 50 weight parts of butadiene or 5 to 60 weight parts of butyl acrylate and 5 to 35 weight parts of methyl methacrylate based on 100 weight parts of the total monomers in the core; and b) preparing a shell by polymerizing monomer mixtures comprising ethylene unsaturated acid of up to 10 weight parts, 0 to 50 weight parts of styrene, 15 to 55 weight parts of butadiene or 30 to 70 weight parts of butyl acrylate and 0 to 20 weight parts of methyl methacrylate based on 100 weight parts of the shell, the content ratio of ethylene unsaturated acid being lower than that of in the core, in the presence of the core;

wherein:

the ethylene unsaturated acid is one or more selected from the group consisting of acrylic acid, methacrylic acid, crotonic acid, itaconic acid, fumaric acid and maleic acid; the paper coating latex is styrene-butadiene based latex or styrene-acrylate based latex;

the glass transition temperature of the core is 5 to 100° C.;

the glass transition temperature of the shell is −20 to 10° C., and lower than that of the core; and wherein the gel content of the core is 76 to 90%, the gel content of the shell is 70 to 95% and the paper coating latex swells at a size of at least 1.3 time an average particle diameter in a coating composition of pH 8 to 10; and the pH of the paper coating latex is 4 to 5.

13. The method of claim 12, wherein the steps a) and b) further comprises using one or more molecular weight regulator selected from the group consisting of n-dodecyl mercaptan and t-dodecyl mercaptan.

14. A paper coating composition comprising the paper coating latex of claim 1.

15. The paper coating composition of claim 14, comprising 5 to 20 weight parts of the paper coating latex based on 100 weight parts of ground calcium carbonate.

16. A coated paper prepared by applying the paper coating composition of claim 14.

* * * * *